United States Patent

Melvin

[15] 3,676,654

[45] July 11, 1972

[54] DIGITALIZED FILTER

[72] Inventor: William J. Melvin, Costa Mesa, Calif.

[73] Assignee: Collins Radio Company, Cedar Rapids, Iowa

[22] Filed: May 21, 1970

[21] Appl. No.: 39,190

[52] U.S. Cl. ....................235/152, 235/156, 235/164, 235/197, 328/167

[51] Int. Cl. ....................G06f 15/34, G06f 7/39

[58] Field of Search..................235/152, 156, 164, 183, 197; 340/15.5 DP, 15.5 CP, 15.5 AF; 307/229; 328/165, 167

[56] References Cited

UNITED STATES PATENTS

| | | | |
|---|---|---|---|
| 3,531,632 | 9/1970 | Herr | 235/176 |
| 3,526,760 | 9/1970 | Ragen | 235/158 |
| 3,518,629 | 6/1970 | Frankel | 235/160 |
| 3,543,012 | 11/1970 | Courtney | 235/152 UX |
| 3,518,414 | 6/1970 | Goodman et al. | 235/164 |
| 3,303,335 | 2/1967 | Pryor | 235/152 X |
| 3,521,041 | 7/1970 | Van Blerkom et al. | 235/164 X |
| 3,521,042 | 7/1970 | Van Blerkom et al. | 235/156 |
| 3,464,022 | 8/1969 | Locheed et al. | 340/15.5 DP |

*Primary Examiner*—Eugene G. Botz

*Assistant Examiner*—James F. Gottman

*Attorney*—Bruce C. Lutz and Robert J. Crawford

[57] ABSTRACT

A digital filter constructed to digitally filter signals primarily of the sampled data format which filter will not oscillate due to overloading and which can be easily connected to a string of similar filters for performing complex filter operations due to internal word size and the manner of truncation of the output signal. Some embodiments of the filter may be constructed according to a general digital filter algorithm.

13 Claims, 11 Drawing Figures

INVENTOR.
WILLIAM J. MELVIN
BY Bruce C. Lutz
ATTORNEY

INVENTOR.
WILLIAM J. MELVIN
BY Bruce C. Lutz
ATTORNEY

TIMING DIAGRAM

INVENTOR.
WILLIAM J. MELVIN
BY Bruce C. Lutz
ATTORNEY

INVENTOR.
WILLIAM J. MELVIN
BY Bruce C Lutz
ATTORNEY $$Y_{(n)} = X_{(n)} + AW_{(n-1)} - BW_{(n-2)}$$

$$W_{(n)} = Q\left[Y_{(n)}\right]$$

$$Q[V_1] = V_1$$

$$Q[V_2] = V_2 - 2L$$

$$Q[V_3] = V_3 + 2L$$

INVENTOR.
WILLIAM J. MELVIN

BY Bruce C Lutz

ATTORNEY

INVENTOR.
WILLIAM J. MELVIN
BY Bruce C Lutz
ATTORNEY

| Y | 16 8 4 2 1 | Q(Y) | REGION |
|---|---|---|---|
| +3 | 00011 | +3 | 1 |
| −3 | 11101 | −3 | 1 |
| +13 | 01101 | −3 | 2 |
| −13 | 10011 | +3 | 3 |
| −6 | 11010 | −6 | 1 |
| +10 | 01010 | −6 | 2 |

INVENTOR.
WILLIAM J. MELVIN

BY Bruce C. Lutz
ATTORNEY

DIGITALIZED FILTER

BACKGROUND OF THE INVENTION

The present invention is related generally to electronic filters and more specifically to digital filters.

The prior art has many analog filters but until very recently it was impractical to even consider a digital filter due to the great implementation cost involved. However, with the advent of large scale integration techniques it is now possible and even advantageous to digitally filter signals rather than change digital signals representative of a waveform to an analog form and then analog filter them and return the signals in sample data format to digital information signals.

The interest in digital filters is evidenced by various recent articles such as an article in the Proceedings of the IEE, Volume 55, No. 2, February 1967, page 149 titled "Digital Filter Design Techniques in the Frequency Domain" by Charles M. Rader and Bernard Gold. A further presentation on the subject was made in June, 1969 by Stanley A. White at a NEC Seminar in St. Charles, Illinois and recorded in a paper titled "Recursive-Digital-Filter Accuracy Requirements" in conjunction with an implementation paper by Lloyd A. Taylor. The last paper is a more detailed version of a presentation made in Chicago in December, 1968. Although the information in these articles is accurate as far as it is extended, a filter constructed according to the algorithms of these articles may break into oscillation due to the fact that there is no provision for prevention of overloading of the constructed filter. Further, a filter constructed by these techniques will, depending upon its implementation, provide an unwieldly output signal or produce a large amount of quantizing noise, or both, and the signal must be further processed in order to be utilized with further digital computations or filter sections. Finally, no constraints are placed on the algorithm constants to teach the reader the filter limitations.

The present invention provides a digital filter constructed to overcome these problems which in the past have prevented a digital filter from operating in accordance with the theory behind the algorithms as set forth therein.

It is therefore an object of the present invention to provide an improved filter constructed according to digital signal techniques.

Other objects and advantages of the present invention will be apparent from a reading of the following specification and claims and a study of the attached drawings wherein:

THE INVENTION

Figure 1:
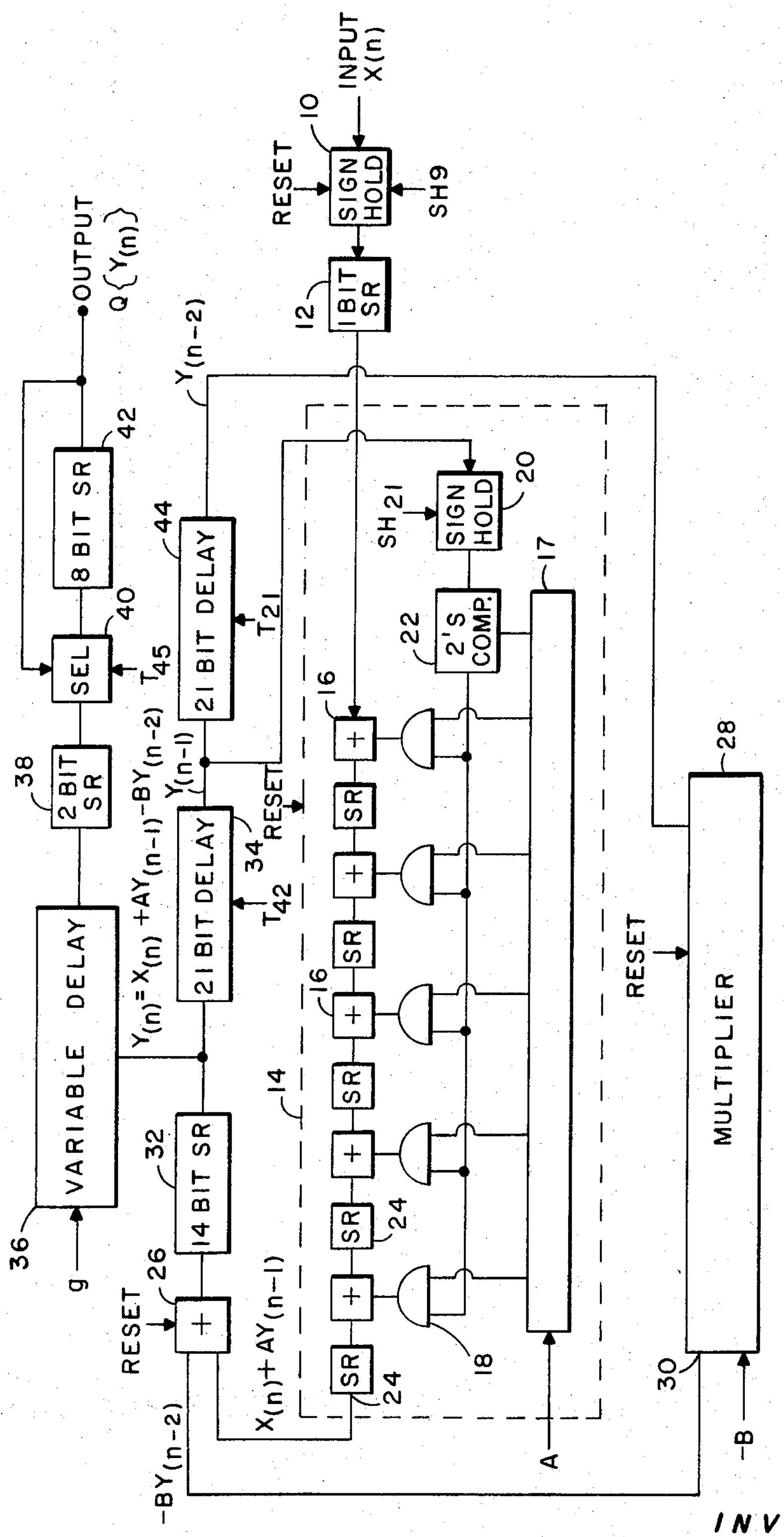
FIG. 1 is a block diagram of an embodiment of the invention constructed to filter signals according to a given algorithm.

The computation required in order to implement the general digital filter is $$Y_{(n)}=g\,[X_{(n)}-CX_{(n-1)}]+AY_{(n-1)}-BY_{(n-2)} \quad \text{Equation 1}$$

where the filter is to be used as a bandpass filter the constraints are that $$[-2^L+1]< Y_{(n)} < [2^L-1]$$

$$-2<A<2$$

$$0<B<1$$

$$-1<C<1$$

$$[-2^H+1]<X_{(n)}<[2^H-1]$$

where $g$ = 1/Filter Gain $N$ = $n^{th}$ sample interval $L$ = Number of magnitude bits used in the storage of $Y_{(n)}$ $H$ = Number of magnitude bits at the input and at the output $X_{(n)}$ = The sampled input signal, one sample value (word) each sampling clock $Y_{(n)}$ = The sampled output signal, one value or computation word per each input sample $X_{(n-i)}$ = The sampled input signal delayed by $i$ samples $Y_{(n-i)}$ = The sampled output delayed by i samples $A$ = The fixed time invariant coefficient that determines the resonant frequency $B$ = *The fixed time invariant coefficient that determines the bandwidth or Q of the filter*

In more technical terminology the constants $A$ and $B$ are used to determine the poles while $C$ is used to determine the zeros.

Where the above formula is used specifically for designing a low pass filter, the constants $A$, $B$, and $C$ are modified to new constraints as follows:

$$B=0$$

$$0<A<1$$

$$C=0$$

if the filter is not designed utilizing the above constraints a pole stability problem occurs which is distinct from an overloading stability problem to be discussed infra.

The pole stability problem occurs when the selection of the filter parameters ($A$, $B$) results in a pole that is either on or outside of a unit circle. The stability requirement for any sample data configuration is that its poles lie within a unit circle. This can be shown by observing that the poles (Z-plane) are transformed from those in the S-plane by the expression $$Z_p=\exp\{(S_p=-a\pm jb)\,T\}$$

$$Z_p=\exp\{-at\}\,exp\{\pm jbT\}$$

$$r=exp\{-at\}<1 \text{ if } a>0$$

$$>1 \text{ if } a<0$$

But $a>0$, yields poles in the lefthand S-plane and $a<0$ yields poles on the $jw$ axis or in the right-hand S-plane with a resulting instability. The poles for a positive $A$ are in the right half of the Z-plane, for $A$ equal zero are on the imaginary axis, and for $A$ negative in the left-hand Z-plane. The pole locus as $A$ increases from zero then proceeds around the circle of radius $r$ (equal to $\sqrt{B}$) until they meet at the point $$Z_p=\frac{A}{2}+j\sqrt{B-\frac{(A)^2}{4}}=\frac{A}{2}=r=\sqrt{B}$$

$$A=2\sqrt{B}$$

The poles then split and one approaches the origin while the other approaches the unit circle. The poles for these values of $A$ are then $$Z_p=(A/2)\pm\sqrt{(A/2)^2-B}$$

When $Z_p$ is on the unit circle ($Z_p=1$), a perfect integrator results and data samples are processed with infinite gain. The filter yields an output even if the input is removed. This occurs at the value $$Z_p=(A/2)+\sqrt{(A/2)^2-B}=1$$

$$A=1+B$$

To maintain a stable filter, $$A<1+B$$

Further generalized discussions as to this stability problem may be obtained from the above referenced prior art. However, in no instance is the subject brought up of the constraints that must be utilized to produce a stable filter.

Figures 2, 3, 4, 6:
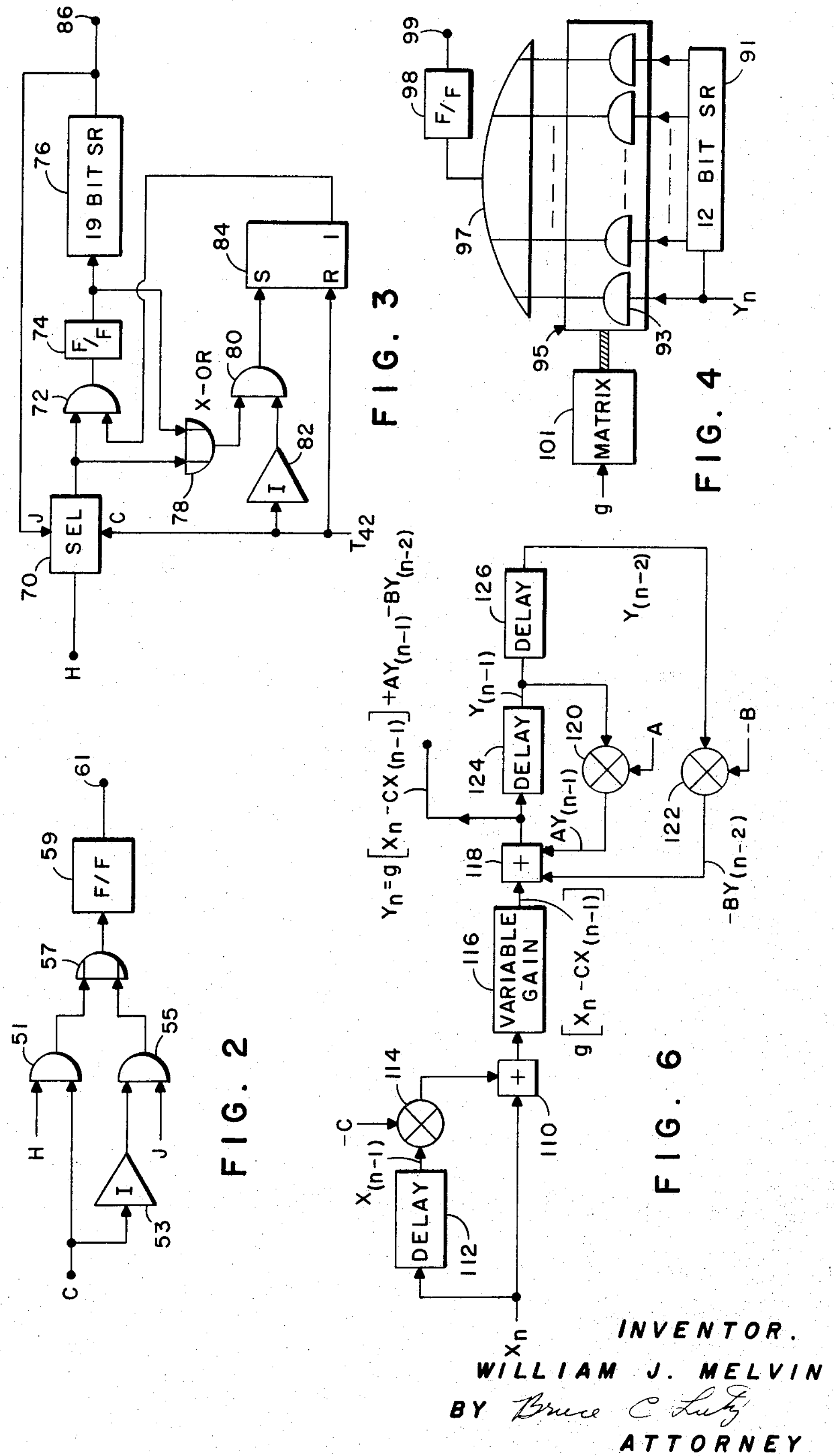
FIG. 2 is a block diagram of a select gate utilized in FIG. 1 and again in FIG. 3.
FIG. 3 is a detailed block diagram presentation of one of the 21 bit delay blocks of FIG. 1 and in particular shows the method of detecting and preventing overload conditions which result in oscillation of the filter.
FIG. 4 is a detailed block diagram of the variable delay block of FIG. 1.
FIG. 6 is a general block diagram of an embodiment constructed for use with a general digital filter algorithm.

FIG. 6 is one possible implementation of the general formula expressed in Equation 1. It could be simplified in the number of inplementation blocks used but would be somewhat harder to explain. As shown, an input signal $X_{(n)}$ is provided to a full adder 110 and also delayed one word sample time in a delay block 112. The delayed signal is then multiplied by $-C$ in multiplier 114 and presented to another input of full adder 110. The output is then varied in gain in accordance with $g$ in a block 116 which may be substantially the same as FIG. 4 to be later described. The output of block 116 is added in a block 118 with the inputs from two multipliers 120 and 122 which have previously multiplied $A$ and $-B$ respectively times the first and second delayed representations of the output signal. The output of adder 118 is $Y_{(n)}\cdot Y_{(n)}$is delayed in blocks 124 and 126 by one and two word time periods respectively in a manner corresponding with blocks 34 and 44 of FIG. 1 respectively.

As shown, FIG. 6 is technically correct but impractical. The output word is not truncated to enable easy connection of further series filters having input $X_{(n)}$word length capacity and at times the block 116 may reduce the amplitude of $q\ [X_{(n)} - CX_{(n-1)}]$ to a level such that noise will mask the signal to be filtered.

To overcome the above practical problems as well as the problems of preventing overloading of the storage units 124 and 126 and reducing the effect of quantizing noise buildup in the output signal $Y_{(n)}$, the following implementation of a particular algorithm was designed as shown in FIG. 1.

The filter of FIG. 1 was designed to implement the formula $$Y_{(n)}= gX_{(n)} + AY_{(n-1)}-BY_{(n-2)} \qquad \text{Equation 2}$$

As will be noted $C$ of Equation 1 is zero in Equation 2 thereby denoting that there are no zeros in the filter of FIG. 1.

Figure 5:
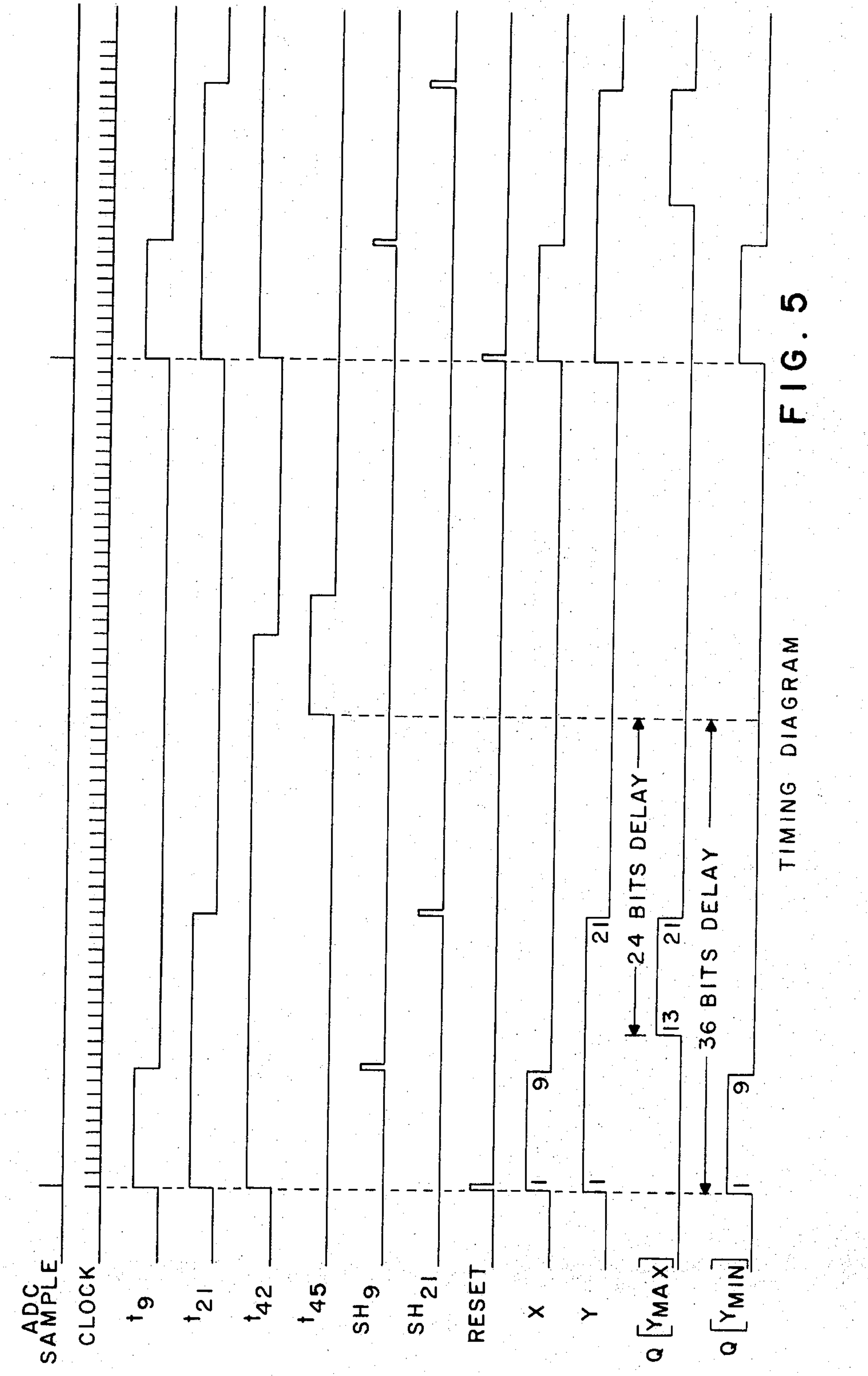
FIG. 5 is a timing diagram to be used in conjunction with FIG. 1.

An input signal $X_{(n)}$ is supplied to a first input of a sign hold block 10 which also has a reset input which is applied to other blocks throughout the circuit and an input SH9 which is a clock derived input of the type shown in the timing diagram of FIG. 5. An output from sign hold block 10 is supplied to a 1 bit delay, storage means or shift register 12 and from there to an input of a multiplier block 14. The multiplier block may be constructed according to the principles disclosed in a copending application Ser. No. 14,151 filed Feb. 25, 1970 in my name and titled "Digitalized Multiplier" and assigned to the same assignee as the present invention. As described in the referenced application, a multiplier constructed in accordance with the principles outlined therein can accept an input signal to be added to the product of two other signals. The delayed $X_{(n)}$ input signal is placed in the full adder or summing means section 16 of the multiplier in preparation for further operations.

A constant input signal $A$ is supplied to a further input of multiplier 14 and converted in block 17 from serial to parallel form to be supplied to each of the gates 18. A final input signal $Y_{(n-1)}$ is supplied to the multiplier and eventually to gates 18 in serial form after being passed through a sign hold block 20 and a 2's complementer 22. The multiplication is then performed as outlined in the above referenced application and output signals representative of a $X_{(n)} + AY_{(n-1)}$ appear at an output 24. These signals are supplied to an input of a full adder or summing means 26. These signals are of course in serial bit form. Simultaneously a further multiplier 28 receives $-B$ input signals and $Y_{(n-2)}$signals to be multiplied and provided at an output 30 which are supplied to a second input of full adder 26. This input is as shown $-BY_{(n-2)}$. Thus, the required inputs when added in full adder 26 result in an output which is equal to $Y_{(n)}$. This signal is delayed 14 time clocks in the 14 bit shift register or storage means 32 before being supplied to a 21 bit delay block or storage means 34 and to a variable delay block 36. The variable delay block 36 delays the signal in accordance with a constant input $g$ which truncates $Y_{(n)}$ by selecting the eight most significant magnitude bits of the output signal. This provides unity gain and reduces the effect of noise signals and quantizing. This output signal is then supplied through a two-bit shift register or delay means 38 and a select gate 40 to an eight-bit shift register or storage means 42. The signal, after being received by shift register 42, circulates until receipt of a new digital word. Of course, the signal is available at the output of 42 during each circulation. The output signals from delay 34 are again delayed in a further 21 bit delay register, storage means or shift register 44. The output signal $Y_{(n)}$ is delayed one word in register 34 and is delayed two words by the time it is outputted from register 44. Thus, the signal at the output of block 34 is representative of the previous word at the time that the present word appears at the output of block 32 and the output of block 44 is at the time representative of the word appearing at the output of block 32 two periods or words previously.

It can thus be determined that the filter operates in a feedback type operation and utilizes the output signal for some of the later operations. This type of filter is designated as a recursive filter.

Referring to FIG. 5 in conjunction with FIG. 1, it will be noted that during time $t_9$ the $X_{(n)}$ input is supplied to multiplier 14. During the same time and continuing until the end of $t_{21}$ the output signal $Y_{(n)}$ is being supplied to the variable delay 36 and eventually a part of this signal is supplied to the shift register 42. The application of $Y_{(n)}$ to delay 34 causes the output from 34 to stop recirculating and if the bits were not received at this time by multiplier 14 they would be lost. These signals are also being received during this time period by delay 44 and again the same event occurs. There is a discontinuance of recirculation and therefore the signals must be supplied to multiplier 28 or be lost. As will be noticed, multiplier 28 does not have the upper end input such as used for the input $X_{(n)}$ in block 14 and therefore the multiplier will operate as if this summation input were a zero. On the ninth clock pulse the input SH9 causes the sign of the input signal to remain constant for the remainder of the multiplication operation. The number of bits that this sign is held is of course dependent upon the number of bits in the multiplier and multiplicand. As will be noted, at the end of 21 bits, a pulse is supplied to sign hold 20 and a similar sign hold circuit in multiplier 28 to hold the sign of the $Y$ terms until the completion of the multiplication.

As indicated in the above referenced copending application, the resultant product of the multiplication has a number of magnitude bits equal to the sum of the magnitude bits of the multiplier and multiplicand plus one. As shown, in FIG. 7 of the present application the multiplicand has 20 magnitude bits and one sign bit resulting in 21 bits and the multiplier has five bits representing magnitude plus one bit representing sign. However, the apparatus is clocked such that the 25th magnitude bit is considered as the sign bit and the word is accordingly truncated on the MS (most significant) bit side. This will not cause any problem because the overload detector of FIG. 3 terminates the filter operation before the product at the output of 14 becomes large enough to alter the polarity of the 25th magnitude bit with respect to the sign bit. FIG. 3 will be further discussed infra. Thus, the multiplier 14, output word will be 26 bits comprising 25magnitude bits and one sign bit as supplied to full adder 26. The $t_{42}$ input to delay means 34 thus keeps this delay circuit in a pass-through or read-in condition for 42 timing pulses and allows it to recirculate once completely for the remaining 21 pulses of a 63-pulse timing cycle, which timing cycle was selected for reasons not pertinent to this invention. The delay means 44 receives input timing pulse $t_{21}$ and it reads-in input signals for 21 pulses necessary to fill the recirculating system and recirculates them twice completely for the next 42 pulses. The output circuit receives the timing pulse $t_{45}$ and recirculates for six of the seven-nine bit periods and reads-in input signals for the remaining nine bits as shown. The variable delay unit means 36 delays the application of the signal $Y_{(n)}$ to the select gate 40 by an amount which can vary by 13 bit positions so that the signal at the output is selected from the eight most significant magnitude bits plus the sign bit of the 25 bit answer word $Y_{(n)}$. Since the answer word is 25 bits it will be noted that the delays 34 and 44 also must truncate or round off the answer to only 21 total bits.

The operation of FIG. 1 will be returned to after an explanation of some of the other figures in the application.

FIG. 2 is a select gate such as may be found as gate 40 in FIG. 1. An input C is supplied to one input of an AND-gate 51 and also through a digital inverter 53 to a similar input of a second ANDigate 55. The gates 51 and 55 each have a second input H and J, respectively. The outputs of AND-gates 51 and 55 are supplied to two inputs of an OR gate 57 which supplies an output through a flip-flop 59 to an output 61 of the FIG. 2 circuit. The purpose of the flip-flop 59 is to provide a delay in accordance with utilization of this invention in other apparatus and is not required except for the purposes of timing to correspond with the timing diagram of FIG. 5. In operation, a high input signal at control input C will activate AND-gate 51 and not 55 since the inversion of a high signal will result in a low signal or a zero at the upper input of gate 55. Thus, only the input signal H will be provided through the OR gate to the output 61. On the other hand, a low signal at control C will not pass the H signals at 51 because this is a "zero" input but will result in a "one" or high input at the output of inverter 53 so as to pass the J signals to the output 61.

FIG. 3 utilizes the apparatus of FIG. 2 in a select gate 70 which has inputs C, J, and H corresponding to the same inputs of FIG. 2. An input signal to be delayed is supplied to input H of select gate 70. An output of select gate 70 is supplied to a first input of an AND gate 72 having an output supplied through a flip-flop 74 to an input of a 19 bit shift register or delay 76 and also to a first input of an exclusive OR-gate 78. The output of the select gate 70 is also supplied to a second input of the exclusive OR-gate 78. An output of exclusive OR-gate 78 is supplied to a first input of an AND-gate 80 which receives a second input from a digital inverter 82. An input $T_{42}$, which is merely a control signal, is supplied to the C-input of select gate 70, to the input of inverter 82 and to an R or reset input of a flip-flop 84. An output of AND-gate 80 is also supplied to an S or set input of flip-flop 84. An output of flip-flop 84 is supplied as a second input to AND-gate 72. An output of the shift register 76 is supplied to an output terminal 86 and also to the J-input of select gate 70.

As indicated supra, one of the problems solved by the present invention is the instability phenomenon that results from overflow in the arithmetic computation, $Y_{(n)}=X_{(n)}+AY_{(n-1(}-_{(n-2)}$. The storage or delay elements 34 and 44 are finite length shift-registers and therefore must be limited with respect to the amplitude of the signal that can be handled. The register 34 truncates or quantizes the arithmetic resultant, $Y_{(n)}$, and stores it until the next input sample $X_{(n)}$is received. The effect of this truncation is shown in FIG. 9 with respect to the very general implementation of FIG. 8. If an example is considered where the registers have 21 bits of storage and the multipliers have five-bit coefficients, the resultant computation is in general 26 bits. However, as previously indicated, the register accepts only 21 of these thereby requiring the discardation of some of the bits.

The effect of having insufficient register length to contain the most significant bits of $Y_{(n)}$ creates a violent non-linearity. This can be seen from the transfer response, Q[Y], of the quantizing shown in FIG. 9. Several examples of output samples, Q[V], for given input samples, V, are shown. It should be noted that the function block described as Q(Y) is not actually a piece of physical hardware, but a result of providing insufficient register length to store the computation $y_{(n)}$. To eliminate this nonlinearity problem would require an infinite length register. The following examples will shown how the digital filter with truncation can support sustained oscillations, even with the input removed [$X_{(n)}$= zero].

Figure 11:
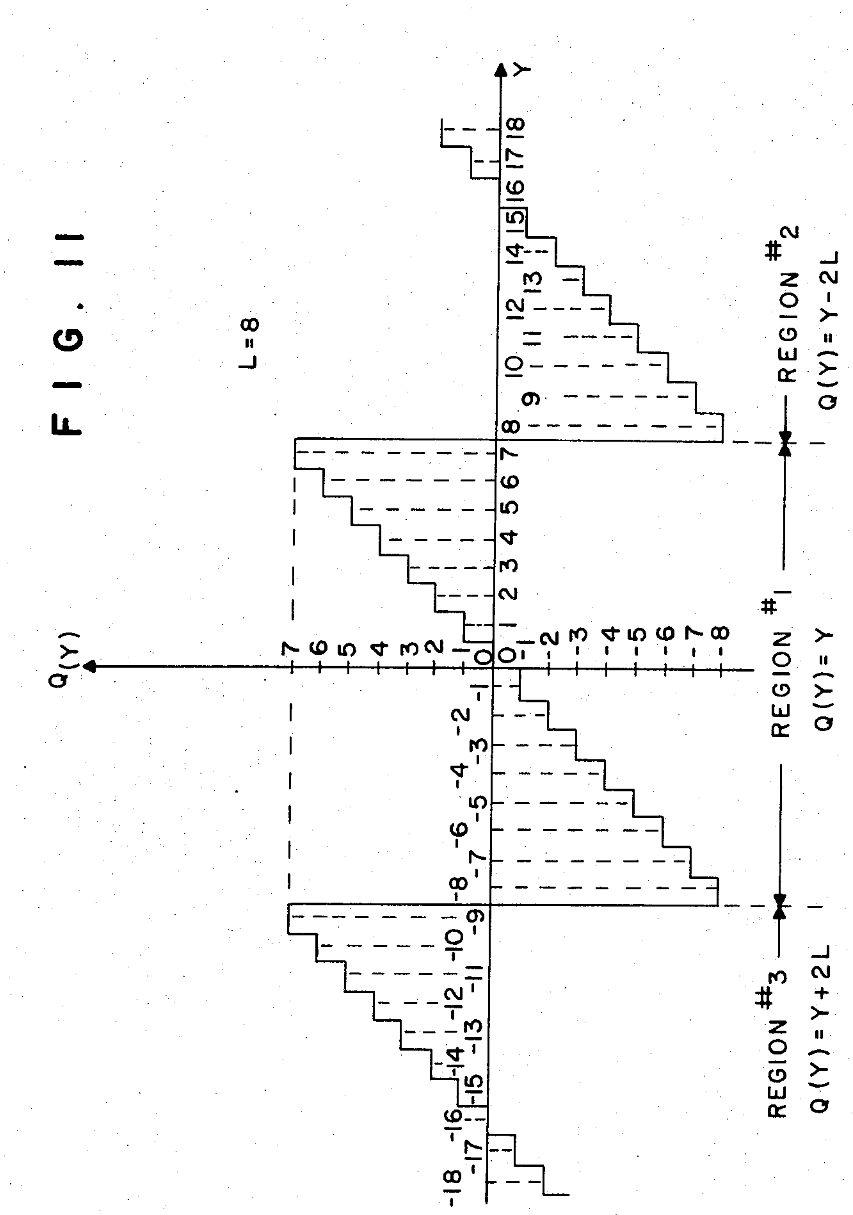

An example of this MS bit truncation phenomenon for a three-bit magnitude plus sign bit two's complement format type word is shown in FIG. 11. The L value is the smallest number which would be incorrectly interpreted by the computing units. The value for L would be eight in this example. The sign bit is assumed to be the fourth from the right in the associated table. Three of the examples in the table exceed the maximum value of L. Word + 13 is located in region 2 per the diagram, word −13 is located in region 3, and word +10 is located in region 2.

It may thus be determined that only the words within region No. 1 are correctly interpreted by the multiplier in the next multiplication operation. Any words outside this region No. 1 will result in the output producing the violent non-linearity referenced above.

Figure 10:
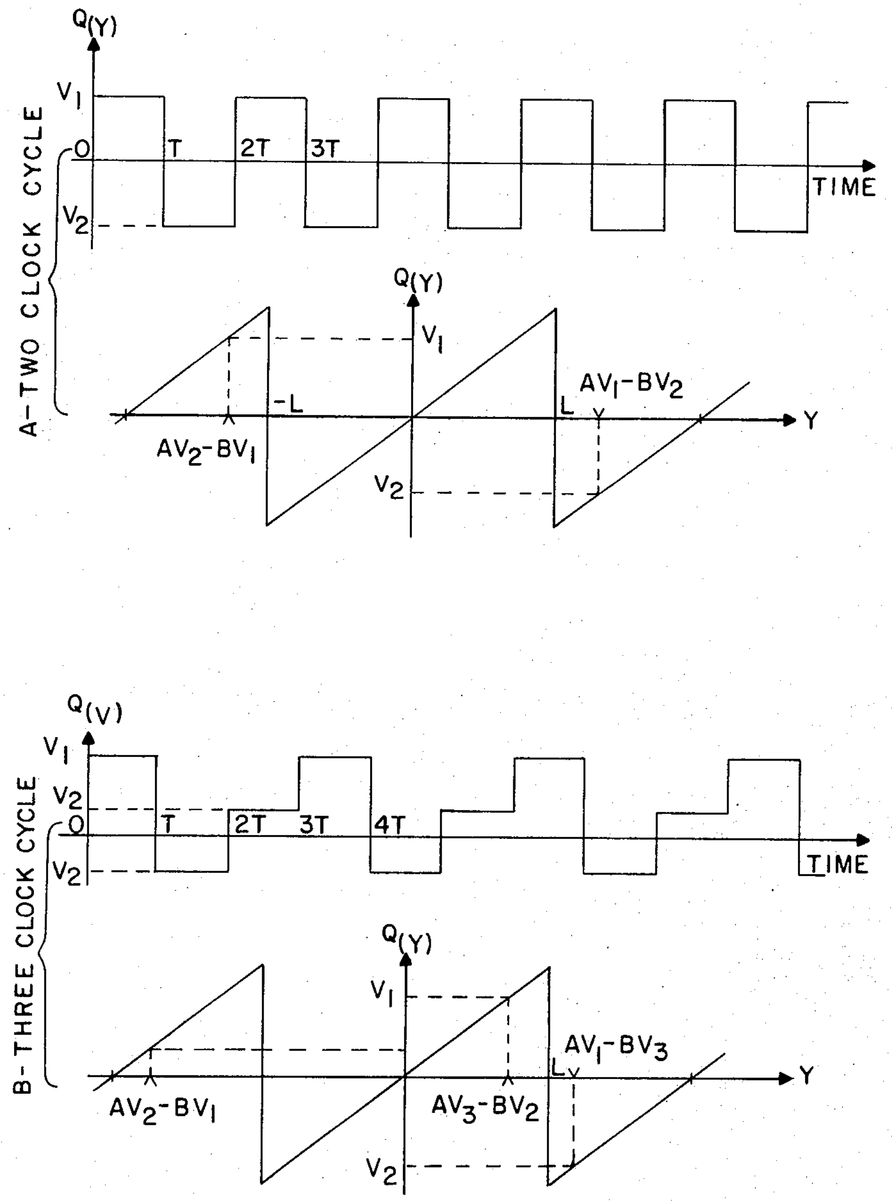

Consider the waveform Q(Y) (the two clock cycle) FIG. 10A. A set of equations can be written and solved such that the given waveform can be sustained with $X=0$.

$$V_1=Q(AV_2-BV_1)=AV_2-BV_1+2L$$

$$V_2=Q(AV_1-BV_2)=AV_1-BV_2-2L$$

Rewriting $$(1+B)V_1+(-A)V_2=2L$$

$$(-A)V_1+(1+B)V_2=2L$$

Yielding $$V_1=\frac{2}{1+A+B}L \qquad V_2=\frac{-2}{1+A+B}L \qquad (3)$$

In addition, the following inequality must be true, $$L>V_1>0$$

$$0>V_2>-L$$

From previously recited constraints $$-2<A<2 \text{ and } 1>B>0$$

Therefore $$L > V_1=\frac{2L}{1+A+B} > \frac{2L}{1+2+1}=\frac{L}{2} > 0$$

Figure 8:
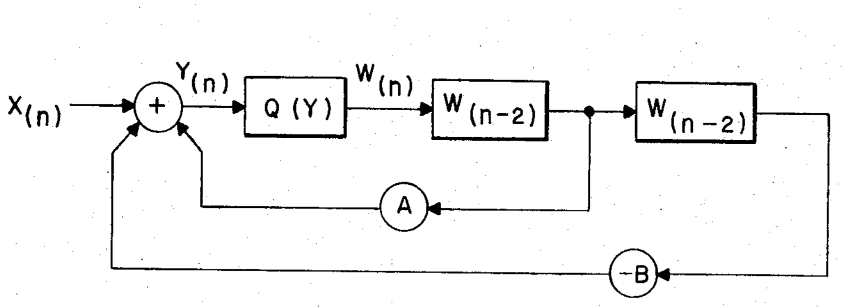
FIG. 8 is a generalized filter block diagram for use in explaining the oscillations which occur upon overloading the storage registers.
Figure 9:
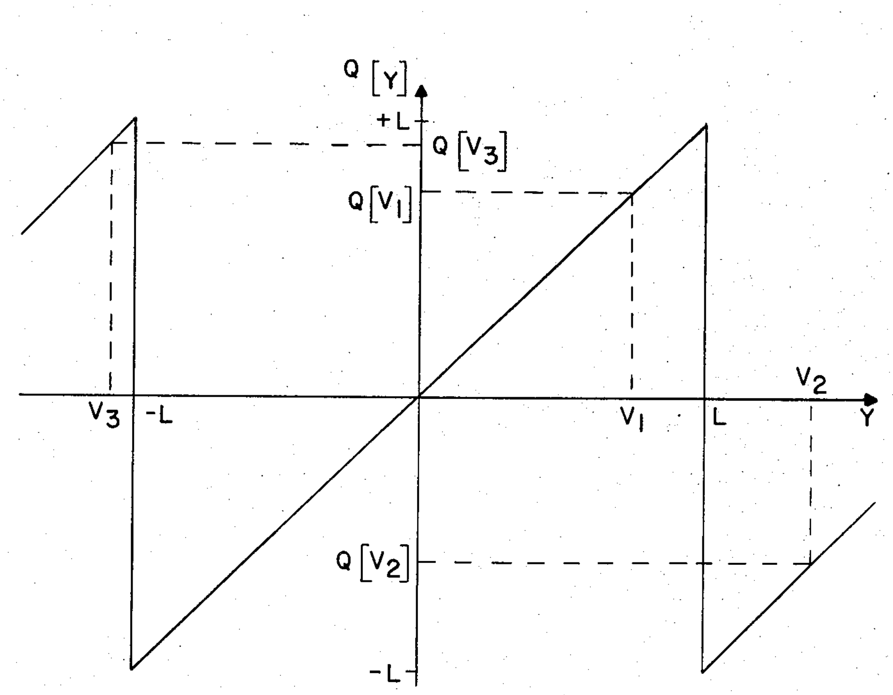
FIGS. 9–11 provide further explanatory graphs used with FIG. 8 in conjunction with the overloading explanation.

The filter shown in FIG. 8 can sustain the two clock cycle when $$A+B>1 \qquad \text{Equation 4}$$

If the register values $V_1$ and $V_2$ are both between half and full scale and negatives of one another and if the conditions of Equation 4 are met, the filter will sustain the two clock cycle shown in FIG. 10A.

Consider now the waveform Q(Y) for FIG. 10B (three clock cycle). The filter can sustain the waveform if the following equations are solvable and if the required inequalities are met.

$$V^2=Q(AV_1-BV_3)=AV_1-BV_3-2L \qquad \text{Equation 5}$$

$$V_3=Q(AV_2-BV_1)=AV_2-BV_1+2L$$

$$V_1=Q(AV_3-BV_2)=AV_3-BV_2$$

Rewriting, $$(A)V_1+(-1)V_2+(-B)V_3=2L$$

$$(B)V_1+(-A)V_2+(1)V_3=2L$$

$$(1)Vz(B)V_2+-A)V_3=0$$

Yielding $$V_1=\frac{2(A+B+B^2-A^2)}{(1+AB)^2+(B-A^2)(B^2+A)}L$$

$$V_2=\frac{-2(1+AB+B-A^2)}{(1+AB)^2+(B-A^2)(B^2+A)}L$$

$$V_3=\frac{2(1+AB-A-B^2)}{(1+AB)^2+(B-A^2)(B^2+A)}L.$$

Also $$L>V_1>o$$

$$0>V_2>-L$$

$$L>V_3>-L$$

Although the showing of other sustained modes are possible, it is believed that the principle has been established. Several examples have been mathematically solved to demonstrate a way of eliminating these sustained waveforms. A solution is suggested by the fact that these oscillations only exist when overflow exists repeatedly. Where overflow is avoided, there is no possibility for these oscillations. The parameter limits $(A.B)$ are such that overflow can not exist if the data samples are restricted to half scale or less. One solution would be to reset the filter when the computation exceeds half scale $(L/2)$.

Since the presentation of examples illustrating the above material would not substantially enhance the ability of one skilled in the art to build the present invention and further since the material added would be substantial, such examples have not been included in this material.

As indicated, the function of FIG. 3 is to detect a condition where the numbers stored in the apparatus of FIG. 3 exceed half of the full possible storage. This will occur in the use of binary numbers when the sign bit is not the same as the most significant bit. In other words, in the number 0100 which is equivalent to 4, the first zero is indicative of the sign, which is positive or plus, while the most significant magnitude bit or one is indicative of the decimal number four. As can be determined, the sign and most significant bits are not the same. Thus, this is more than half of the maximum total number of seven which would be represented by 0111. If the number were 0011 or 3 which is less than half the maximum total of 7 then the sign and most significant bits would agree.

In reviewing FIG. 3 it will be determined that when $t_{42}$ occurs it will reset the flip-flop 84 so that a logic one appears at the output and provides a first input to AND-gate 72. It also produces a negative-going pulse through inverter 82 to AND-gate 80. AND-gate 80 is designed such that it reacts only to positive-going pulses and therefore is non-responsive. The select gate 70 receives the positive level at C and thus in accordance with FIG. 2 will receive inputs only from input H. The incoming signal is then supplied to the select gate 70 (which has one delay period or the effect of a one-bit shift register) and through the AND-gate 72 including its delay or flip-flop 74 and to the 19-bit shift register 76. At the end of the $t_{42}$ pulse time period, the pulse returns to zero thereby allowing recirculation of the incorporated 21 bit word. $T_{42}$ returning to zero produces a positive-going pulse through inverter 82 to activate AND-gate 80. At this point in time the word is fully loaded in the shift register with the sign bit in the select gate 70 and the most significant bit appearing in flip-flop 74. Thus, if these two digits do not agree, there will be an output from exclusive OR-gate 78 to set the flip-flop 84 and provide a zero at the output thereof. This zero output will then render the AND-gate 72 inactive and the shift register 76 along with the storage elements 70 and 74 will be filled with zeros during the next 21 bits since AND-gate 72 will not be receiving one input as the data bits are attempting to recirculate. On the other hand, if the sign and most significant bit were the same, the exclusive OR gate would not provide an output since an exclusive OR will only provide an output if the inputs are unlike. In this event, there would not be the required two input ones to AND-gate 80 and the flip-flop 84 would remain in its reset condition and the word would recirculate as intended. It can thus be determined that upon the occurrence of a digital word having more than half scale, it will be detected by the circuitry of FIG. 3 and the stored number will immediately be reduced to zero.

As indicated, the reduction to zero of the word in the storage register 34 is important in preventing oscillations of a digital filter since the continued occurrence of a digital number or word which exceeds the multiplication capabilities of the storage devices will result in oscillations, this can be eliminated by preventing the multiplicand from ever exceeding half scale. One fourth or other scales may also be detected by appropriate connections. A latching visual circuit can be connected to the output of 78 to indicate that a resetting of the digits in 76 has occurred to allow readjustment of the filter gain.

The circuit of FIG. 4 provides the variable delay function of block 36 in FIG. 1. The input $Y_{(n)}$ is supplied to a 12-bit shift register 91 and also to a first AND-gate 93 within block of AND gates generally designated as 95. The block 95 contains 12 more AND gates only some of which are shown and each of whose outputs are supplied to a multiple input OR-gate 97 which has a bit delay flip-flop 98 for timing purposes prior to an output 99. The 12-bit shift register 91 has 12 outputs only three of which are shown connected to AND gates within block 95. A matrix 101 is shown with an input $g$ and an output in the form of cable which serves to control which one of the 13 AND gates in block 95 will pass a signal therethrough. The matrix 101 may be constructed in accordance with well-known digital techniques to select a particular AND gate. In the alternative the matrix 101 could merely be replaced by a 13 position switch with one of each of the output leads being connected to an individual AND gate. The input $g$ is a constant for a particular filter operation and thus a 13 position switch would work equally as well in the embodiment shown. As will be determined, an input signal being applied at input terminal $Y_{(n)}$ will be delayed by an amount determined by which of the AND gates is allowed to pass the signal.

If the output of the matrix 101 supplies a signal only to the AND-gate 93, there will be no delay through the circuitry of FIG. 4. On the otherhand, if the matrix 101 selects the last gate of 95 then there will be a 12-bit delay in receipt of the signal at output terminal 99.

Figure 7:
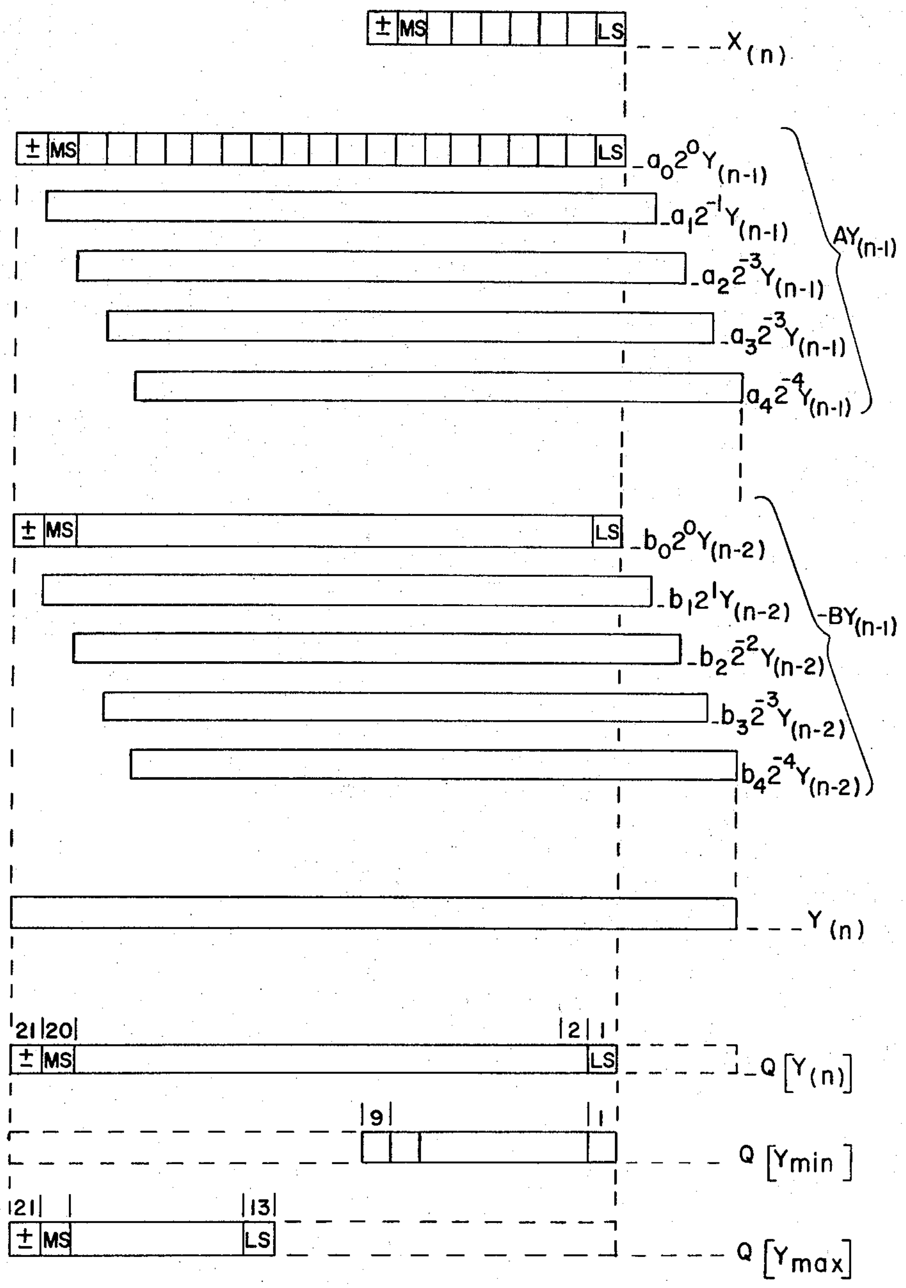
FIG. 7 is a functional timing diagram of an implementation of FIG. 1.

The computation algorithm used with reference to FIG. 1 is shown in functional form in FIG. 7. The input $X_{(n)}$ is defined to nine bits including sign bit and the output word $Y_{(n)}$ is defined to 21 bits. The extension of the word $X_{(n)}$ to 21 bits by the sign hold block 10 does not affect the accuracy of the answer since the number does not change by additional 1's or 0's extending the sign bit information. The $Y_{(n)}$ word also includes the sign bit and as shown the coefficients A and B which are defined to a five bit accuracy. The output computation $Y_{(n)}$ results in a 25-bit word (after the truncation of the MS bit as previously explained). This 25-bit word (after the truncation of the MS bit as previously explained). This 25-bit word is truncated as shown to $Q|Y_{(n)}|$ so that these samples can be stored as 21-bit delayed versions of $Y_{(n)}$ or $Y_{(n-1)}$ and $Y_{(n-2)}$. In order to be able to cascade the filter sections ad infinitum, only the most significant nine bits were selected in the embodiment shown and to be passed on to a further filter section also utilizing a nine-bit input. In the embodiment shown, the most significant nine bits are selected from the 21-bit sample. While any position of the 25-bit output word could have been used there is no point in selecting from the entire 25-bit word since it has already been truncated for the remaining filter purposes. The smallest 9 bit word would be $Q|Y_{min}|$ since these would be the least significant bits (1 through 9 of the 21-bit word) and would be the first digits appearing at the output. Thus, in order to select these bits the maximum delay is applied in variable delay so that these nine bits appear during time period T45. The largest number $Q|Y_{max}|$ would be obtained by selecting the most significant nine bits of $Y_{(n)}$ or bits 13 through 21 of the 21-bit word. To obtain these bits there would be only one bit delay in block 36, again so that bits 13 through 21 of the 21-bit word will appear to select gate 40 during time $t_{45}$.

Any attempt to follow the delays through the circuitry must be made in accordance with the realization that in the design of the disclosed embodiment a full adder contains no logical delay, while the sign hold, select gates, and 2's complement blocks each contain one bit of delay and the shift registers provide the delay indicated.

The effect of truncation of the MS bit has been discussed supra. The truncation of the LS (least significant) four bits also has an effect on the filter system. When a number is "rounded off" or truncated, the LS digit in the truncated number may be in error by up to one-half the value of that LS digit. This error is commonly referred to in a system as quantizing noise since the effect on the system is to produce finite errors in the resulting stored numbers or words in a manner somewhat similar to the effect of noise signals. Quantizing also produces a stepped output as shown in FIG. 11 rather than the smooth slope idealized output shown in FIG. 9. The multiplication of the stored truncated number(s) by new constants can build up the quantizing noise or error level in subsequently stored numbers to a significant level. Thus the use of the stored 21-bit number in further computations external to the subject filter may be undesirable since there is no way of knowing how much error is in the output word.

However, it can be determined experimentally or mathematically that the continued truncation of the LS four bits of each product will result in a certain maximum error in the 21-bit word. A smaller word, such as nine bits, may be used as the output word from the MS bits of the 21-bit word. The maximum error in this nine-bit word will then be $\pm \frac{1}{2}$ the value of the LS bit. In general, it is better for the purposes of later computations and filtering operations to have a set constant maximum quantizing noise level of one-half the LS bit than to have to wonder how many of the LS bits are in error due to quantizing.

Referring again to FIG. 1 and FIGS. 5 and 7 where necessary, FIG. 1 will be further explained. A nine-bit input word $X_{(n)}$ is received each ADC sample period. The sample word is delivered to the filter with the least significant bit first. The least significant bit is abbreviated in FIG. 7 and LS. The input is passed through the sign hold circuit and a one-bit delay 10 and 12 respectively and added time coincident with the partial product of the most significant bit of A and the least significant bit of the word $Y_{(n-1)}$. On the next timing clock pulse it is added in the second full adder of the multiplying unit in a manner outlined in the previously referenced copending application. Most of the multiplication answer will arrive at the lower input to full adder 26 before completion of the multiplication. This least significant bit of the multiplication of $A \times Y_{(n-1)}$ added to $X_{(n)}$ will be added to the least significant bit of the multiplication of $-B\ Y_{(n-2)}$. These bits will then proceed through the shift register 32 sequentially and be supplied to select gate 40 through the delays 36 and 38. However, if select gate 40 is not in the read-in condition the supplied digits merely will not be utilized.

As previously mentioned, the multiplication product as utilized is a 25-bit word. It will be noted that as the least significant bit leaves the shift register 34, there is a one-bit delay in each of the blocks 20 and 22 and then one-bit delay in the last SR stage of the multiplier. Further, there are 14 bits delay in the shift register 32. This totals 17 bits delay. When the least significant product and summation bit reaches the least significant bit position in shift register 34 during the multiplication process, the 17 bits delay prior to delay 34 plus the 21 bits delay within register 34 totals 38 bits. Since the control signal is $t_{42}$, the shift register is in a read-in condition for 42 bits. Thus, the least significant bit and the next three lesser significant bits are shifted out of 34 and are blocked by sign hold 20. This results in the truncation of the 25-bit word to a 21-bit word in the delay means 34.

As will be realized, all the logic units including the shift registers are continuously clocked with the clock signal shown in FIG. 5. The select gate; such as 70, within a particular delay unit allows the register to read-in the data bits applied to the input H and when deactivated allows the data in register to recirculate. As previously mentioned, the timing control $t_{21}$ allows the shift register 44 to accept the output of register 34 during the first 21 clocks and to recirculate twice, 42 bits, before the next computation. AFter the two circulations, the output from register 44 will be in the proper position for computation of the next output $Y_{(n)}$.

The nine-bit output $Q|Y_{(n)}|_{truncated}$ is obtained by controlling the output register 42 to read-in for nine bits and recirculate for the remainder of the 63-bit sample period. The nine-bit read-in interval commences at bit 37 and ends at bit 45. This is shown as control signal $t_{45}$ in FIG. 5. It can also be seen from FIG. 5 that if $Q|Y_{min}|$ is to be selected, then the least significant bit of $Y_{(n)}$ in register 34 must encounter 36 bits delay before it reaches the select gate 40. This 36-bit delay is obtained as follows:

Multiplier 14, seven bits delay, 14 bits delay from the fixed storage register 32, 12 bits delay from the variable gain register 36, one bit delay from the gain select gate 98 and two bits delay from the fixed storage 38. It was previously indicated that the multiplier 14 has only three bits delay. While this is a correct statement, the least significant bit which is first received from register 32 is not utilized. Thus, in considering the fact that the fifth bit out of multiplier 14 is the least significant of the 21 bits which are actually utilized by the filter, the delay can be considered as a seven-bit delay.

If the word $Q|Y_{max}|$ is to be presented to the output register 42, the 12 bits delay in the gain register 36 must be removed so that there is only 24 bits delay from the time of the least significant usable bit of $Y_{(n)}$ to the select gate 40. Thus, the first 12 bits of the word $Y_{(n)}$ are presented to the select gate 40 and disregarded. When the select gate 40 is activated immediately after bit 36, it receives bit 13 of word $Y_{(n)}$ and continues receiving bits for the next remaining eight bits of the output word.

While only an explanatory and an implementation embodiment of two algorithms are shown and discussed, it will be apparent from a reading of the specification that other digital filters can be implemented using the blocks shown and connecting them up to produce the results required by the formulas. The embodiments shown are of course not the only possible implementation of a particular formula.

However, for stability of filter operation, the filter must fall within the constraints set out for constants A, B, and C and to prevent oscillations in a practical fixed point arithmetic computational unit there must be provision for the times when the product exceeds the product storage capability of the computational units. Further, if the filter is to be used in combination with other filters for complex filtering operations, it is desirable to truncate the output to contain the same bits of information in the output word as is received at the input.

Therefore, I wish to be limited not by the particular embodiments shown but only by the scope of the appended claims wherein I claim:

1. The method of preventing oscillations in a digital filter due to overloading the number word storage capabilities thereof comprising the step of terminating filtering operations when the number of significant bits in the number word being stored exceeds a predetermined ratio of the filter storage capability.

2. Apparatus for recovering a given size word comprising a portion of a larger word comprising, in combination:

first means for presenting a word consisting of M bits in serial bit format commencing at time T;

second means for commencing serial read-in of a word of M-N bits at time T+D and continuing for M−N bits where N and D are positive and M−N equals the given size word;

and selected delay means connected between said first and second means for delaying the time of presentation of the word to said second means between T and T+D wherein the delay is selected in accordance with the portion desired of the larger word obtained from said first means.

3. Recursive digital filter apparatus for digitally filtering a signal wherein said filter comprises at least one storage means for temporarily storing the product of feedback signal operations, the improvement comprising, in combination:

monitoring means for controlling apparatus oscillations connected to said storage means and adapted to provide an output when the word being monitored exceeds a predetermined magnitude.

4. Apparatus as claimed in claim 3 wherein the monitoring means compares the sign bit and one of the magnitude bits in the storage means.

5. Recursive digital filtering apparatus of the type which may oscillate upon repeated overflow of digital storage registers comprising in combination:

first input means for supplying a digital input signal to be filtered;

first storage means for storing signals supplied thereto and providing an output indicative of the stored signal;

second input means for supplying an input multiplier signal;

multiplier means connected to said first and second input means and to said storage means for multiplying the output signal received from said storage means by the signal received from said second input means and for adding the signal received from said first input means to the product of the multiplication process before supplying the digital result signal in serial bit stream format to said storage means to be stored; and monitoring means for providing an output for preventing oscillations of the filtering apparatus when the digital results signal supplied to said storage means exceeds a predetermined magnitude.

6. Recursive digital filtering apparatus comprising in combination:

first input means for supplying a digital input signal to be filtered;

first storage means for storing signals supplied thereto and providing an output indicative of the stored signals;

second input means for supplying an input multiplier signal;

multiplier means connected to said first and second input means and to said storage means for multiplying the output signal received from said storage means by the signal received from said second input means and for adding the signal received from said first input means to the product of the multiplication process before supplying the result signal in serial bit stream format to said storage means to be stored; and reset means for preventing oscillations of the filtering apparatus by resetting the word in said storage means to a lesser number when the number supplied thereto exceeds a predetermined magnitude.

7. Apparatus as claimed in claim 6 wherein said reset means comprises comparison means for checking the sign bit with one of the magnitude bits to determine when the predetermined magnitude is exceeded.

8. Apparatus as claimed in claim 7 wherein the comparison means comprises an exclusive OR gate and said reset means also includes means for providing an output indicating when a reset has occurred.

9. Apparatus as claimed in claim 6 wherein said multiplier means includes at least two multiplying units and summing means for adding the products of said multiplying units before supplying the sum to said storage means and wherein said storage means provides two different words simultaneously to said two multiplying units.

10. Apparatus claimed in claim 6 comprising in addition:

second storage means for reading-in a word, of a serial bit length which is less than the result signal supplied to said first storage means commencing at a given time subsequent to the initial generation of said result signal; and means for delaying the transmission of signals therethrough in accordance with a control input connected to supply said result signal to said second storage means to provide controlled truncation of said result signal.

11. A filter for sampled signals expressed in digital form comprising storage, multiplication and summing means and constructed to directly implement the following equation:

$$Y_{(n)} = g[X_{(n)} - CX_{(n-1)}] + AY_{(n-1)} - BY_{(n-2)}$$

Where $X_{(n)}$ = The sampled input signal, one sample value each sampling clock $Y_{(n)}$ = The sampled output signal, one value or computation per each input sample $Y_{(n-i)}$ = The sampled output delayed by $i$ samples $X_{(n-i)}$ = The sampled input delayed by $i$ samples $A$ = Fixed time invariant coefficient that determines the resonant frequency, $(-2.0 < A < +2.0)$ $B$ = Fixed time invariant coefficient that determines the bandwidth or Q of the filter $(0<B<1.0)$ $-1 < C < l$ 12. A digital filter for sampled signals expressed in digital word format and including a filter output comprising:

means for receiving the sampled signals;

first register means for storing signals appearing at the output of said digital filter delayed by one word;

second register means for storing signals appearing at the output of said digital filter delayed by two words;

first means for multiplying the contents of said first register means by a first constant;

second means for multiplying the contents of said register by a second constant, said first constant being between −2 and +2, said second constant being between 0 and 1, said first constant also being less than 1 + the value of said second constant;

and summing means for summing each sampled input signal and the outputs of said first and second multiplication means and supplying the summation to the filter output.

13. A digital filter as defined by claim 12 wherein at least one of said first and second register means includes means for resetting upon the contents of said one register exceeding half-scale of said register.

* * * * *

UNITED STATES PATENT OFFICE
CERTIFICATE OF CORRECTION

Patent No. 3,676,654 Dated July 11, 1972

Inventor(s) William J. Melvin

It is certified that error appears in the above-identified patent and that said Letters Patent are hereby corrected as shown below:

Column 3, line 15, delete "$q[X_{(n)}$" and substitute therefor --$g[X_{(n)}$--

Column 4, line 5, before "time" insert --same--

Column 5, line 2, delete "ANDigate" and substitute therefor --AND gate--

Column 5, line 41, delete "$n-11^{-}(n-2)$" and substitute therefor --$(n-1)^{-BY}(n-2)$--

Column 6, line 62, delete "$(1)Vz(B)V_2+-A)V_3=0$" and substitute therefor --$(1)V_1+(B)V_2+(-A)V_3=0$--

Column 8, lines 45 and 46, delete "This 25-bit word (after the truncation of the MS bit as previously explained)."

Column 11, line 22, delete "results" and substitute therefor --result--.

Signed and sealed this 12th day of December 1972.

(SEAL)
Attest:

EDWARD M.FLETCHER,JR.
Attesting Officer

ROBERT GOTTSCHALK
Commissioner of Patents